United States Patent [19]

McKendrick

[11] Patent Number: 5,400,517
[45] Date of Patent: Mar. 28, 1995

[54] LOCATOR ASSEMBLY AND METHOD OF MAKING SAME

[76] Inventor: Blair T. McKendrick, 29684 Kenloch Dr., Farmington Hills, Mich. 48331

[21] Appl. No.: 91,228

[22] Filed: Jul. 13, 1993

[51] Int. Cl.⁶ .............................................. B23Q 3/00
[52] U.S. Cl. ...................................... 33/573; 33/529; 33/549
[58] Field of Search ................. 33/573, 533, 645, 549, 33/568, 569, 570, 623, 529, 503

[56] References Cited

U.S. PATENT DOCUMENTS

| | | | |
|---|---|---|---|
| 2,713,725 | 7/1955 | Goldsmith | 33/552 |
| 4,122,608 | 10/1978 | Hopf | 33/549 |
| 4,258,474 | 3/1981 | DuMez | 33/503 |
| 4,553,334 | 11/1985 | Fell | 33/549 |
| 4,593,476 | 6/1986 | Clark et al. | 33/568 |
| 4,689,891 | 9/1987 | Clark | 33/529 |
| 4,805,316 | 2/1989 | Curti | 33/568 |
| 4,977,683 | 12/1990 | Harder | 33/623 |
| 5,208,995 | 5/1993 | McKendrick | 33/545 |

FOREIGN PATENT DOCUMENTS 1548653 3/1990 U.S.S.R. .................... 33/503

*Primary Examiner*—Christopher Fulton
*Attorney, Agent, or Firm*—Dykema Gossett

[57] ABSTRACT

A locator assembly for locating one end of a part on a fixture gauge includes a fixed portion (20, 22) having a central circular cavity therein, a movable portion (24, 26, 28) slidably captured within the cavity (30), and a locator pin (35) axially shiftable within a central opening in the movable portion. The fixed portion comprises three plastic plates sandwiched together, wherein a central opening of the middle plate is smaller in diameter than the central openings of the outer plates. The movable portion likewise includes three additional plates sandwiched in face-to-face contact with each other with respective, concentric central openings therein for receiving the locator pin therethrough. The locator pin is therefore longitudinally slidable along its axis and includes an annular shoulder (38) for engaging and aligning one end of the part. The movable portion is captured and slidable within a recess in the fixed portion so that the locating pin can be moved in a plane perpendicular to the longitudinal axis of the pin in order that the pin may be used to properly locate the part on the fixture.

22 Claims, 3 Drawing Sheets

LOCATOR ASSEMBLY AND METHOD OF MAKING SAME

TECHNICAL FIELD

The present invention generally relates to gauges and fixtures, and deals more particularly with a locator assembly of the type normally forming part of a gauge or fixture where it is necessary to precisely locate one end of a part to be checked so that a part rests in a proper attitude in the fixture. The present invention also relates to a locator assembly and a method for making the assembly in which the parts of the assembly can be quickly and easily manufactured from inexpensive, planar material such as a plastic or a laminate, as well as wood or metals.

BACKGROUND ART

Locator assemblies are often used in gauges or fixtures at specific locations to guide or otherwise locate a part to be checked on the fixture in order that it is assured that the part is resting properly on the fixture so that an accurate check can be made of dimensional variations. For example, tubular parts, such as gas lines, being manufactured in high volume contain various bends and features which are checked by placing the tubes on a conventional gauging fixture which is often made up of a number of gauge blocks stationarily secured on a gauge base. Alignment and tolerance marks are formed on the gauge blocks so that when the tube is placed on the gauge fixture, an operator can visually determine whether the features of the tube are within tolerance and meet the reference standard defined by the gauge. The manufacturing tolerance permitted in the parts is reflected in the gauging fixture. Consequently, it is important that the part to be checked lies in a proper, pre-selected attitude on the gauge fixture. In order to accomplish this, locator pins are often used, for example at points on the gauge where the ends of the tubes are disposed. The locator pins are mounted and positioned such that they engage either one or both ends of the tube.

In the past, such locator pin assemblies typically form an integral part of the gauge and therefore must be custom manufactured to suit the geometry of the particular gauge which is built to check a corresponding, particular part. Consequently, prior locator and assemblies are relatively expensive to manufacture since they are often unique to the particular gauge on which they are mounted.

Another problem with prior art locator assemblies is that the locator pins used therein are not freely movable in a plane perpendicular to their longitudinal axis so that the pin can be precisely axially aligned with the central axis of the tube.

It would therefor be desirable to provide a locator assembly of the type employing a pin to locate a part on a gauging fixture, which has universal application on multiple types of gauging fixtures, which is inexpensive and easy to manufacture, and which permits rapid, easy alignment of the locator pin with the central axis of the tube to be checked.

BRIEF SUMMARY OF THE INVENTION

According to one aspect of the present invention, a locator assembly is provided for locating one end of a part on a gauging fixture or the like, which includes a fixed portion mounted on the gauging fixture, a movable portion which is slidably confined in a recess of the fixed portion, and a locator pin mounted on and longitudinally slidable within the movable portion. The fixed portion preferably comprises three planar members made, for example, of simple plastic, laminate, wood or metal sandwiched together in face-to-face contact. Each of these three planar members includes a central, circular opening, with the central opening of the middle planar member being larger than those of the outer planar members so as to define an internal, slot-like recess. The movable portion includes three additional planar members secured together in face-to-face contact, with the two, outer planar members having diameters less than that of the central planar member. The central planar member of the movable portion is confined and movable within the slot-like recess of the fixed portion, and the two outer, circular planar members of the movable portion are aligned with and bear against the openings of the two outer planar members of the fixed portion so as to form a bearing guide arrangement which defines the outer limit of the movable portion. A locator pin is mounted on and may be secured or axially slidable through a central opening in the movable portion so that when the movable portion is shifted in the guide slot, the central axis of the locator pin can be shifted so as to align it with the central axis of a tube to be checked. The locator pin preferably includes an annular depression along a portion of the length thereof which cooperates with one edge of the fixed portion to indicate the relative longitudinal displacement of the locator pin, and thus the longitudinal position of the end of the tube. In effect, the alignment of the edge of the fixed portion and the annular depression in the locator tube reveals whether the position of the end of the tube being checked is within a desired tolerance band.

According to another aspect of the invention, a method is provided for making a locator assembly which involves the steps of forming each of the planar members mentioned above as well as the openings therein, and assemblying these planar members by securing certain of them in face-to-face contact as described above. The planar members are preferably formed by laser cutting a planar sheet of material, such as plastic under the automatic control of a programmed set of instructions, such as a CNC controlled laser cutting machine, although it could be produced using a water jet, mill, etc.

Accordingly, a primary object of the present invention to provide a locator assembly which has general application to a number of different types of gauging fixtures that can be easily and quickly mounted on such fixture.

A further object of the present invention is to provide a locator assembly as described above which includes a locator pin that may be transversely displaced so as to align the central axis of the pin with the central axis of the end of a tube to be checked.

A still further object of the present invention is to provide a locator assembly as described above as well as a method of making the same which is exceptionally simple and economical.

These, and further objects of the invention will be made clear or will become apparent during the course of the following description of a detailed embodiment of the invention.

BRIEF DESCRIPTION OF THE DRAWINGS

In the drawings, which form an integral part of the specification and are to be read in conjunction therewith, and which like reference numerals are employed to designate identical components in the various views.

DETAILED DESCRIPTION OF A PREFERRED EMBODIMENT

Figure 1:
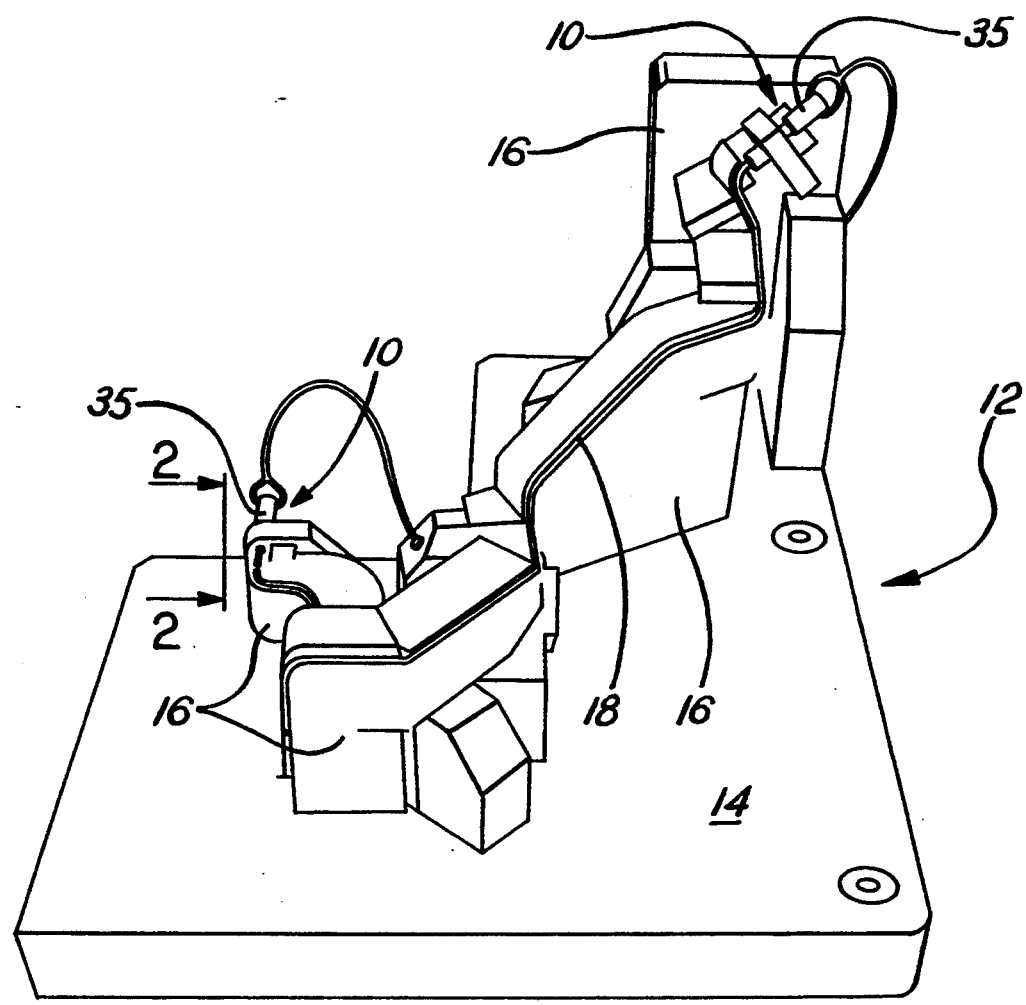
FIG. 1 is a perspective view of a typical gauging fixture employed to gauge features of a tubular part, and showing a pair of the locator assemblies of the present invention mounted thereon for locating the ends of the tube on the fixture.
Figure 2:
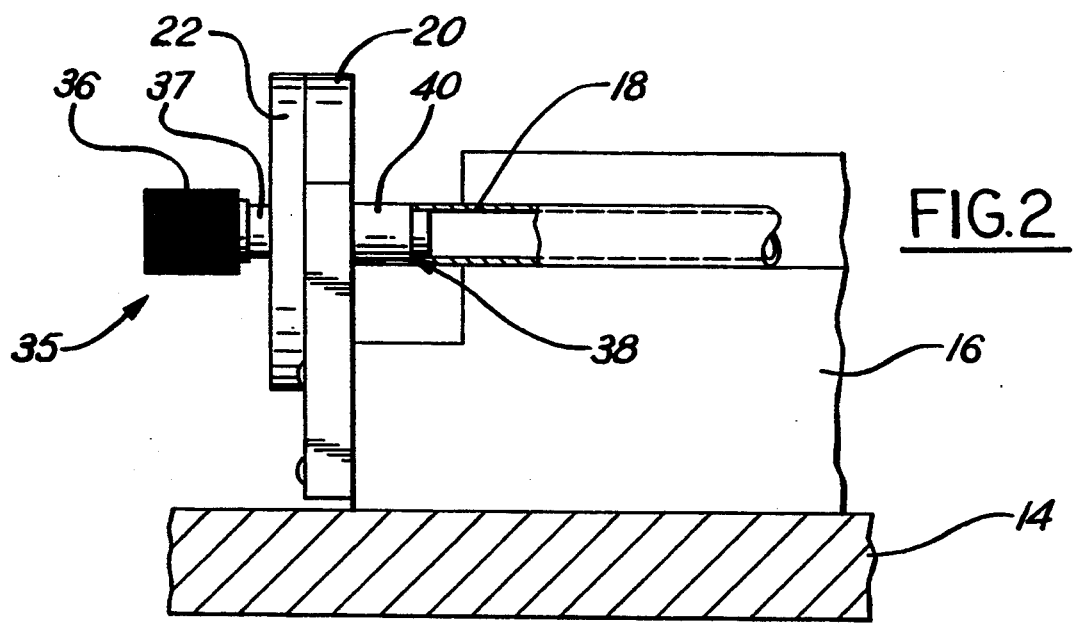
FIG. 2 is a cross-sectional view taken along the line 2—2 in FIG. 1.
Figure 3:
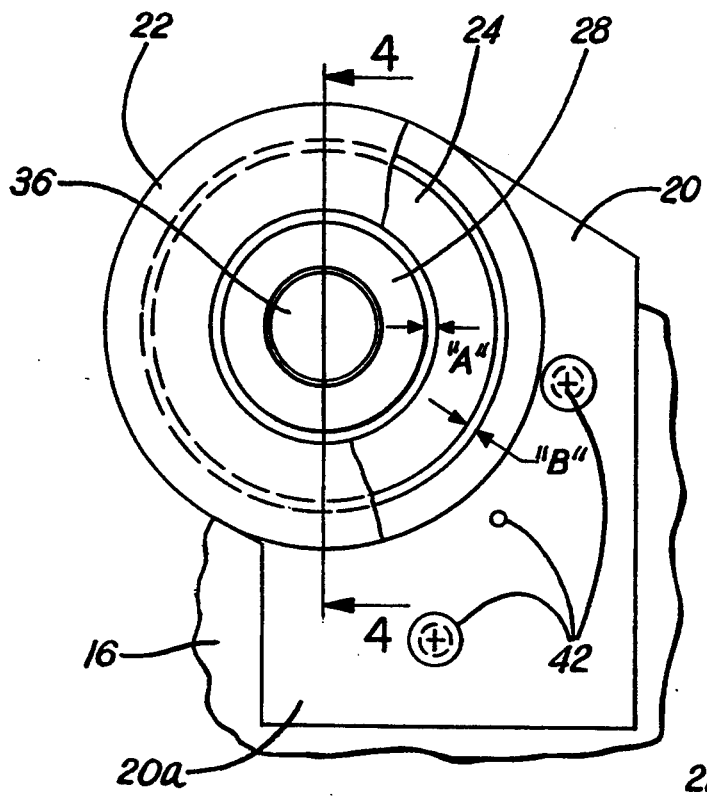
FIG. 3 is an enlarged fragmentary view of one side of the locator assembly of the present invention, parts being broken away for clarity.

Referring first to FIG. 1, the present invention is generally concerned with a locator assembly, broadly designated by the numeral 10 employed on a checking type gauge fixture 12 for determining conformance of the features of a part, such as a tube 18 relative to a reference standard. The reference standard is defined by the contour, placement and alignment marks (not shown) on a plurality of gauge blocks 16 secured on a gauge base 14. In order to assure that the tube 18 is properly positioned on the gauge blocks 16, the locator pins 35 forming part of the locator assemblies 10 are axially displaced into engagement with the ends of the tube 18. As will become later apparent, the locator pins 35 may also be shifted in any direction within a plane which is perpendicular to the central axis of the locator pin 35 so that the operator can quickly, axially align the locator pin 35 with the central axis of the ends of the tube 18.

Referring now to FIGS. 2-6, the locator assembly 10 broadly includes a fixed portion comprising planar members or plates 20, 21 and 22, a movable portion comprising a second set of planar members or plates, 24, 26, 28, and the locator pin 35.

The fixed portion of the assembly includes a lower extending base 20a provided with a number of apertures 42 therein to allow the assembly to be mounted on one of the gauge blocks 16 (FIG. 1) or other portion of the gauge fixture 12. Planar members 20 and 22 include circular, concentric openings 50, 46 therein of identical, pre-selected diameters. Plate 21 likewise has a circular opening 48 therein which is concentric with but larger in diameter than circular openings 46, 50. Plates 20, 21 and 22 are secured together, as with adhesive in face-to-face, sandwiched relationship so that the larger opening 48 forms a inner, circularly shaped, slot-like recess 30 in the fixed portion of the assembly. The thicknesses of the plates 20, 21 and 22 will vary depending upon the application, but should be sufficient so that the interior surface walls around the openings 46, 50 define bearing like raceway surfaces 32, 34, for reasons which will be discussed below.

Plates 24, 26 and 28 which form the movable portion of the assembly are secured together in face-to-face, sandwiched relationship, as with adhesives, with plates 24 and 28 being mounted on opposite faces of the central plate 24. The outer peripheries of plates 24–28 are circular in shape, with the diameters of plates 26 and 28 being slightly less than that of plate 24, and likewise slightly less than the diameters of the circular openings 46 and 50. The plates 24–28 include a central, circular bore 44 therethrough which has a diameter only marginally less than that of the barrel portion 40 of the locator pin 35 so that the barrel portion 40 is snugly but longitudinally slidably received through the bore 44.

Figure 4:
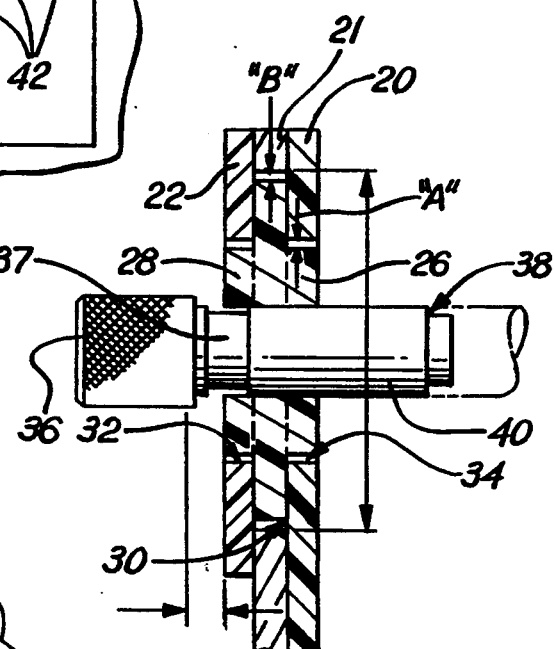
FIG. 4 is a cross-sectional view taken along the line of 4—4 in FIG. 3.
Figure 5:
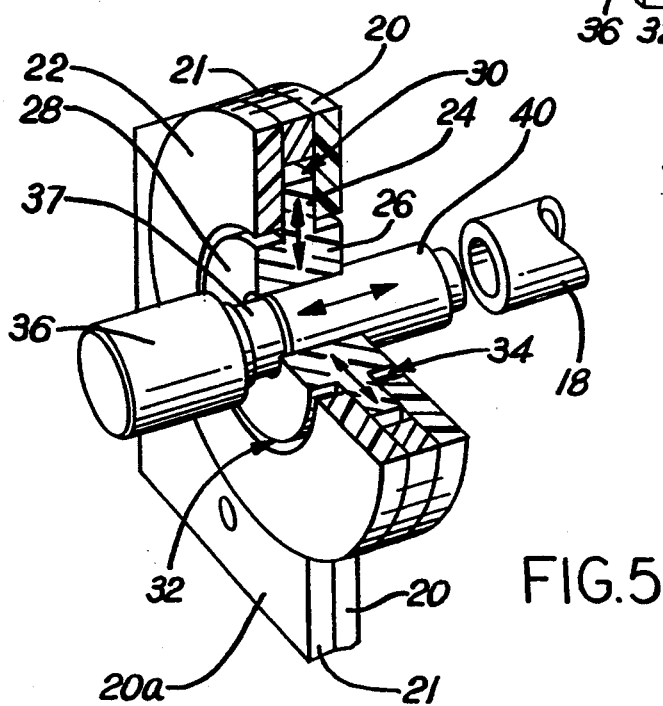
FIG. 5 is a perspective, enlarged view of the locator assembly, parts being broken away in cross-section for purposes of clarity.
Figure 6:
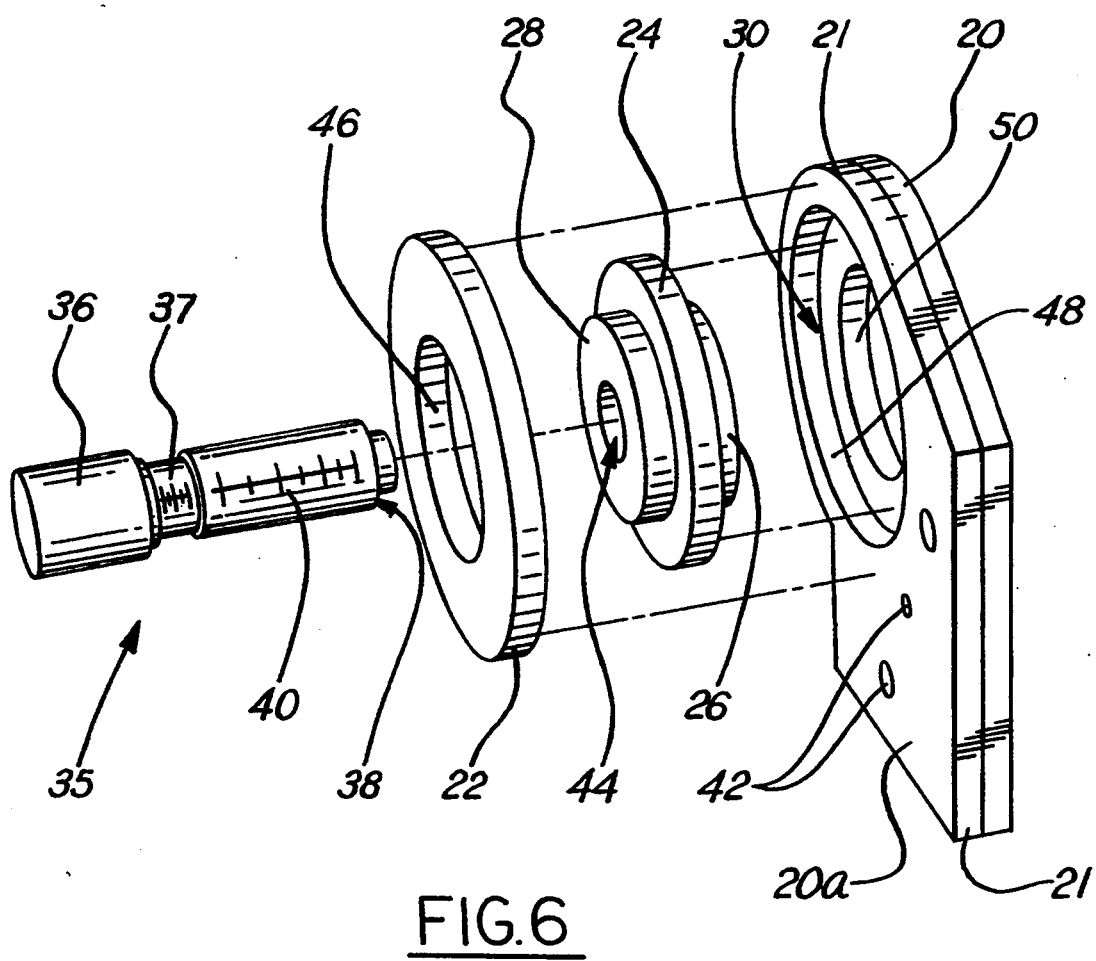
FIG. 6 is a perspective, exploded view of the locator assembly of the present invention.

As best seen in FIGS. 4 and 5, plate 24 is received within the recess 48 and is less in diameter than that of the recess 30 by an amount "B" which will depend upon the particular application of the locator assembly.

Similarly, plates 26 and 28 are respectively received within the circular openings 46 and 50 and possess diameters less than those of openings 46 and 50 by an amount "A" which is predetermined. As best seen in FIG. 4, the alignment of the plates of the fixed and movable portions of the assembly are such that they form three sandwiched layers. The outer circular surfaces of plates 26, 28 act as bearing surfaces which engage the race-like surfaces 32, 34 of plates 20 and 22. Dimension "B" is preferably greater than dimension "A" so that dimension "A" determines the maximum lateral displacement of the movable portion of the assembly. In other words, although plate 24 is free to shift within the guide slot 30, its outer periphery does not actually contact the interior sidewall of the opening 48 in plate 21.

The locator pin 35 is preferably formed of a dimensionally stable material such as metal and includes main, cylindrically shaped barrel portion 40, an outer shoulder portion 38 on one end thereof, an intermediate tolerance band of 37 of reduced diameter which is preferably color coded, and an outer, knurled knob 36. As best seen in FIGS. 4 and 5, the annular shoulder 38 is adapted to engage the end of the tube 18, with the central, circular extremity of the locator pin 35 being received within the tube 18 so as to precisely align the longitudinal axis of the pin 35 and tube 18. As mentioned earlier, the smooth, cylindrical barrel is tightly, but slidably received within the central opening 44 in the plates 24, 26 and 28. By this arrangement, the movable portion comprising plates 24–28 are movable in any direction within its plane of movement so as to permit alignment of the central axis of the pin with that of the tube 18, the maximum amount of such lateral displacement being determined by the difference in diameters between plates 26, 28 and plates 20, 22.

Each of the plates 20, 21, 22, 24, 26 and 28 is preferably made of a rigid, dimensionally stable, inexpensive material, such as plastic or laminate. Where the plates are formed from plastic, a simple glue may be employed to adhesively secure them together in the configuration described above. All of such plates, including each of the openings therein, and all of their surface features are preferably formed by laser cutting in accordance with automatic, pre-programmed instructions. For example, the dimensions and features of each of the plates is preferably input to a simple computer program defining a set of instructions to manufacture the plates. This can easily be performed by generating drawings of the plates using a computer aided design (CAD) program, and then converting such information to a CNC (computer numerically controlled) program which is loaded into a conventional CNC controlled laser cutting machine. A single sheet of flat plastic of the desired thickness is then placed on a table and the laser beam, under CNC control, is employed to cut out each of the plates including the openings thereof.

It should be noted here that although the locator assembly has been disclosed herein as being used to locate a tube in a fixture gage, the assembly has other useful applications. For example, the locator assembly of the present invention could be mounted on a base and employed to receive locating pins on a part which is to be positioned in a desired location on the base.

From the foregoing, it is apparent that the locator assembly and method of making the same described above not only provide for the reliable accomplishment of the objects of the invention, but do so in a particularly effective and simple matter. It is recognized, of course, that those skilled in the art may make various modifications or additions to the preferred embodiment chosen to illustrate the invention without departing from the spirit and scope of the present contribution to the art. Accordingly, it is to be understood that the protection sought and to be afforded hereby should be deemed to extend to the subject matter claimed and all equivalents thereof fairly within the scope of the invention.

What is claimed is:

1. A locator assembly for locating one end of a part relative to a set of reference axes, comprising:
   a fixed portion having a cavity therein at least partially defined by a pair of axially spaced guide surfaces;
   a movable portion mounted within said cavity and having a pair of axially spaced bearing surfaces respectively bearing on and being guided by said pair of guide surfaces, said movable portion being shiftable in multiple directions within a reference plane extending through said fixed portion, said movable portion including a bore therethrough essentially transverse to said reference plane; and,
   a locator pin axially shiftable within said bore and having one end thereof adapted to contact said part.

2. The locator assembly of claim 1, wherein said fixed portion includes first and second outer plates (20, 22) and third inner plate secured together in face-to-face, sandwiched relationship, said bearing surfaces cooperating with said guide surfaces to maintain said locator pin axially aligned.

3. The locator assembly of claim 2, wherein each of said plates includes a central opening therein partially defining said cavity and said guide surfaces are at least partially defined on one of said plates within the central opening therein.

4. The locator assembly of claim 3, wherein each of said central openings is essentially circular in shape.

5. The locator assembly of claim 4, wherein the central opening of each of said first and second outer plates is less in diameter than the diameter of the central opening of said third plate.

6. The locator assembly of claim 3, wherein said movable portion includes first and second outer plates and a third inner plate secured together in face-to-face relationship.

7. The locator assembly of claim 6, wherein each of the plates of said movable portion is essentially circular in shape.

8. The locator assembly of claim 7, wherein:
   the first, second and third plates of said movable portion are respectively coplanar with the first, second and third plates of said fixed portion, and
   the outer diameter of each of the plates of said movable portion is less than the inside diameter of the central opening in the corresponding, coplanar plate in said fixed portion.

9. The locator assembly of claim 6, wherein the plates of said movable portion are formed of a synthetic material sand are adhesively bonded together.

10. The locator assembly of claim 2, wherein said plates are formed of synthetic material and are adhesively bonded together.

11. The locator assembly of claim 1, wherein said locator pin includes a shoulder engageable with said movable portion to limit axial movement of said pin in a direction toward said part.

12. The locator assembly of claim 11, wherein said locator pin includes indicia along the length thereof to provide a visual indication of the position of said part along the axis of said locator pin.

13. The locator assembly of claim 1, wherein one end of said locator pin includes a shoulder engageable with an edge on said part and defining the only area of contact of said locator pin with said part.

14. The locator assembly of claim 1, wherein:
   said fixed portion includes a pair of spaced apart plates respectively having said pair of guide surfaces defined therein, and a third plate between said pair of plates, said third plate including a third guide surface, and
   said movable portion includes a third bearing surface bearing on and being guided by said third guide surface.

15. A locator assembly for locating one end of a tubular part to be checked on a gauging fixture relative to a set of reference axes, comprising:
   a fixed mount secured to said fixture and having an opening therein;
   a movable bearing member mounted for planar movement in at least two directions within the opening in said fixed mount and including a bore therethrough; and
   a locator pin slidable through the opening in said fixed mount and through said bore,
   the combination of said fixed mount and said bearing member being movable in either of said two directions to align said locator pin in a desired relationship to said part, said combination including three axially spaced bearing surfaces and three axially spaced guide surfaces upon which said bearing surfaces bear to maintain said locator pin in axial alignment.

16. The locator assembly claim 15, wherein said locator pin includes an annular shoulder on one end thereof configured to engage one end of said part and axially align said part with a pre-selected reference axis.

17. The locator assembly of claim 16, wherein said locator pin includes an annular band intermediate the opposite ends thereof and positioned along the length of said pin so as cooperate with one edge of said fixed mount to provide an indication of the longitudinal position of said tube on said gauging fixture.

18. The locator assembly of claim 15, wherein said fixed mount includes first and second planar members secured in face-to-face contact with each other, portions of the interior faces of said planar members being spaced apart to define a guide slot in said fixed mount.

19. The locator assembly of claim 18, wherein said movable bearing member includes a third planar member captured between said first and second planar members and slidable within said guide slot, said third planar member including an aperture therein through which said locator pin extends.

20. The locator assembly of claim 19, wherein said bearing member includes fourth and fifth planar members secured on opposite faces of said third planar member.

21. The locator assembly of claim 20, wherein each of said planar members is formed of plastic.

22. The locator assembly of claim 15, wherein said bearing surfaces and said guide surfaces are each circular in shape.

* * * * *